United States Patent
Wysong et al.

(10) Patent No.: US 7,275,701 B2
(45) Date of Patent: Oct. 2, 2007

(54) ADJUSTABLE DISCHARGE APPARATUS

(75) Inventors: Douglas E. Wysong, Camden, OH (US); Joseph A. Bedel, Cincinnati, OH (US)

(73) Assignee: Finn Corporation, Fairfield, OH (US)

( * ) Notice: Subject to any disclaimer, the term of this patent is extended or adjusted under 35 U.S.C. 154(b) by 0 days.

(21) Appl. No.: 10/987,677

(22) Filed: Nov. 12, 2004

(65) Prior Publication Data

US 2005/0103906 A1    May 19, 2005

Related U.S. Application Data

(62) Division of application No. 10/417,787, filed on Apr. 17, 2003, now Pat. No. 6,921,037.

(51) Int. Cl.
*A01C 3/06*    (2006.01)

(52) U.S. Cl. .............. 239/689; 406/158; 406/160; 406/167; 239/665; 239/666; 222/527; 222/533

(58) Field of Classification Search ............ 239/689, 239/665, 666, 505, 513, 514, 515; 406/157, 406/158, 159, 160, 161, 167; 222/527, 533
See application file for complete search history.

(56) References Cited

U.S. PATENT DOCUMENTS

| 702,766 | A | | 6/1902 | Bartholomew | |
|---|---|---|---|---|---|
| 844,317 | A | | 2/1907 | Blake | |
| 931,222 | A | | 8/1909 | Rosenthal | |
| 2,181,795 | A | * | 11/1939 | Thompson et al. | 406/100 |
| 2,226,136 | A | * | 12/1940 | Parker | 239/655 |
| 2,282,828 | A | * | 5/1942 | Root | 239/655 |
| 3,357,749 | A | * | 12/1967 | Seymour et al. | 406/158 |
| 3,675,796 | A | * | 7/1972 | Atkinson et al. | 414/301 |
| 4,008,855 | A | * | 2/1977 | van der Lely | 239/682 |
| 4,824,148 | A | * | 4/1989 | Grabowski | 285/110 |
| 4,913,597 | A | * | 4/1990 | Christianson et al. | 406/39 |
| 4,988,240 | A | * | 1/1991 | Thompson | 406/166 |
| 6,120,211 | A | * | 9/2000 | Raike | 405/79 |
| 6,293,556 | B1 | * | 9/2001 | Krausz | 277/549 |
| 6,422,570 | B2 | * | 7/2002 | Ikeda et al. | 277/552 |
| 6,921,037 | B2 | * | 7/2005 | Wysong et al. | 239/689 |
| 6,938,838 | B2 | * | 9/2005 | Kawamoto | 239/504 |

OTHER PUBLICATIONS

Finn Corporation, B40 Mulch Spreader Parts and Operator's Manual, Apr. 2000, front cover and pp. 1-21.
U.S. Appl. No. 29/179,981.

* cited by examiner

*Primary Examiner*—Joe Dillon, Jr.
(74) *Attorney, Agent, or Firm*—Dinsmore & Shohl (57) ABSTRACT

Adjustable discharge apparatus include a first conduit apparatus with a first conduit section extending along an arcuate path about a pivot axis. A second conduit apparatus is pivotally mounted about the pivot axis in a telescoping relationship with the first conduit apparatus. Adjustable discharge apparatus kits are also provided with a first conduit apparatus, a second conduit apparatus and a third conduit apparatus. The second and third conduit apparatus of the kit are for selective mounting to the first conduit apparatus.

20 Claims, 7 Drawing Sheets

ADJUSTABLE DISCHARGE APPARATUS

RELATED APPLICATION

The present application is a divisional application of application Ser. No. 10/417,787, filed Apr. 17, 2003 now U.S. Pat. No. 6,921,037.

FIELD OF THE INVENTION

The present invention relates to adjustable discharge apparatus, and more particularly to adjustable discharge apparatus for spreading bulk material.

BACKGROUND OF THE INVENTION

A wide variety of adjustable discharge apparatus are currently available in the industry. For example, FIG. 1 discloses a prior art adjustable discharge apparatus for spreading mulch. Mulch can comprise an extensive array of vegetative material such as hay, straw, excelsior or other wood product or other vegetative material. Applying mulch to a landscape terrain may be desirable to promote seedling growth by reducing erosion due to wind and/or rain or discouraging seed consumption by birds and other pests. Applying mulch in a dense layer can reduce the growth of weeds and other unwanted vegetation and can also trap moisture for existing plants.

Figure 1:
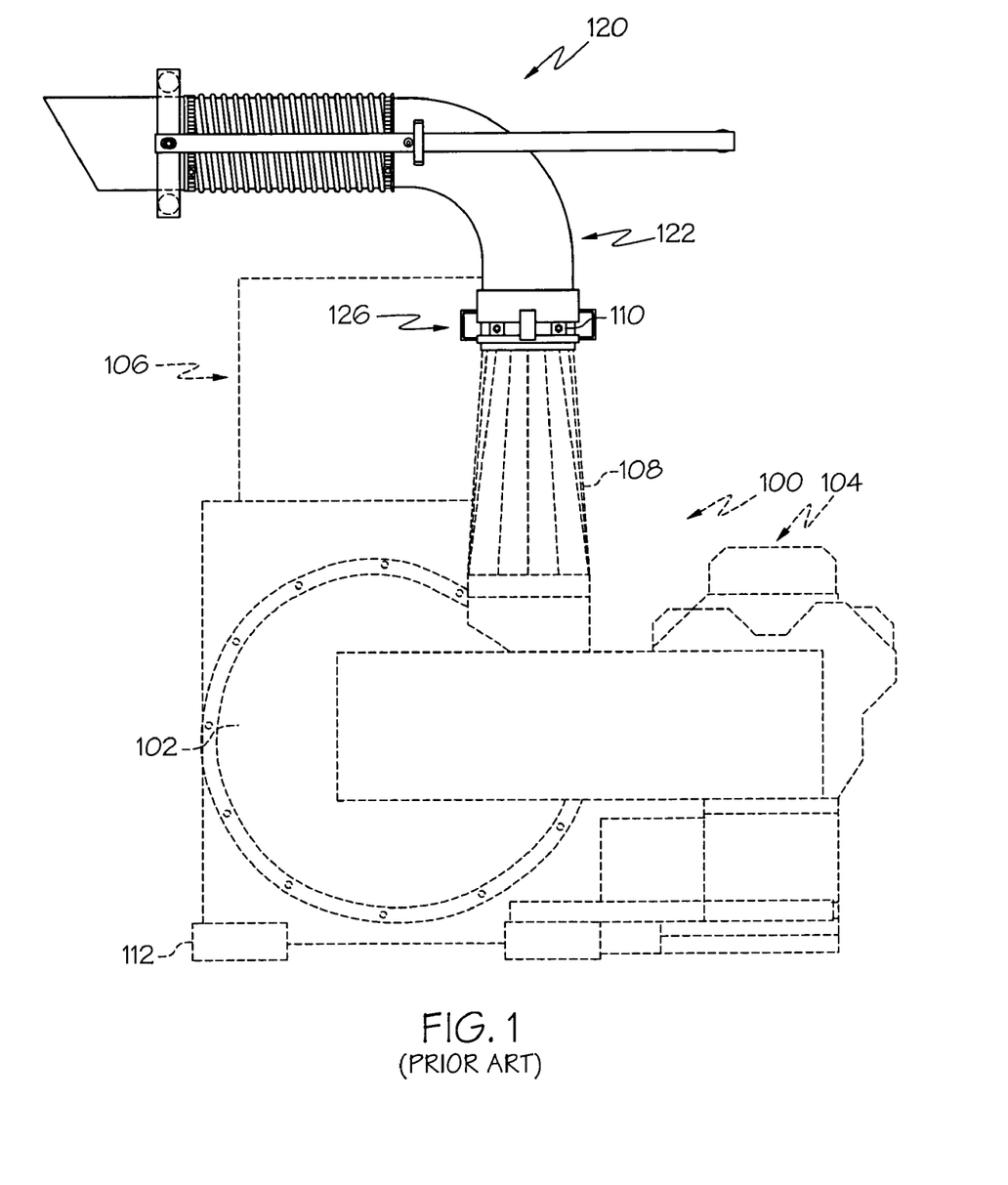
FIG. 1 is a conventional mulch spreader including a conventional adjustable discharge apparatus.

A wide variety of mechanical mulch spreaders are known for alleviating the labor-intensive task of spreading mulch. One conventional mulch spreader 100 is illustrated in FIG. 1 (i.e., partially by broken lines) and can include a skid 112 to facilitate movement, for example, by a skid steer or the like. The mulch spreader 100 includes a motor 104 for driving a blower 102 that forces mulch through a discharge tube 108 to an adjustable discharge apparatus 120.

Figure 2:
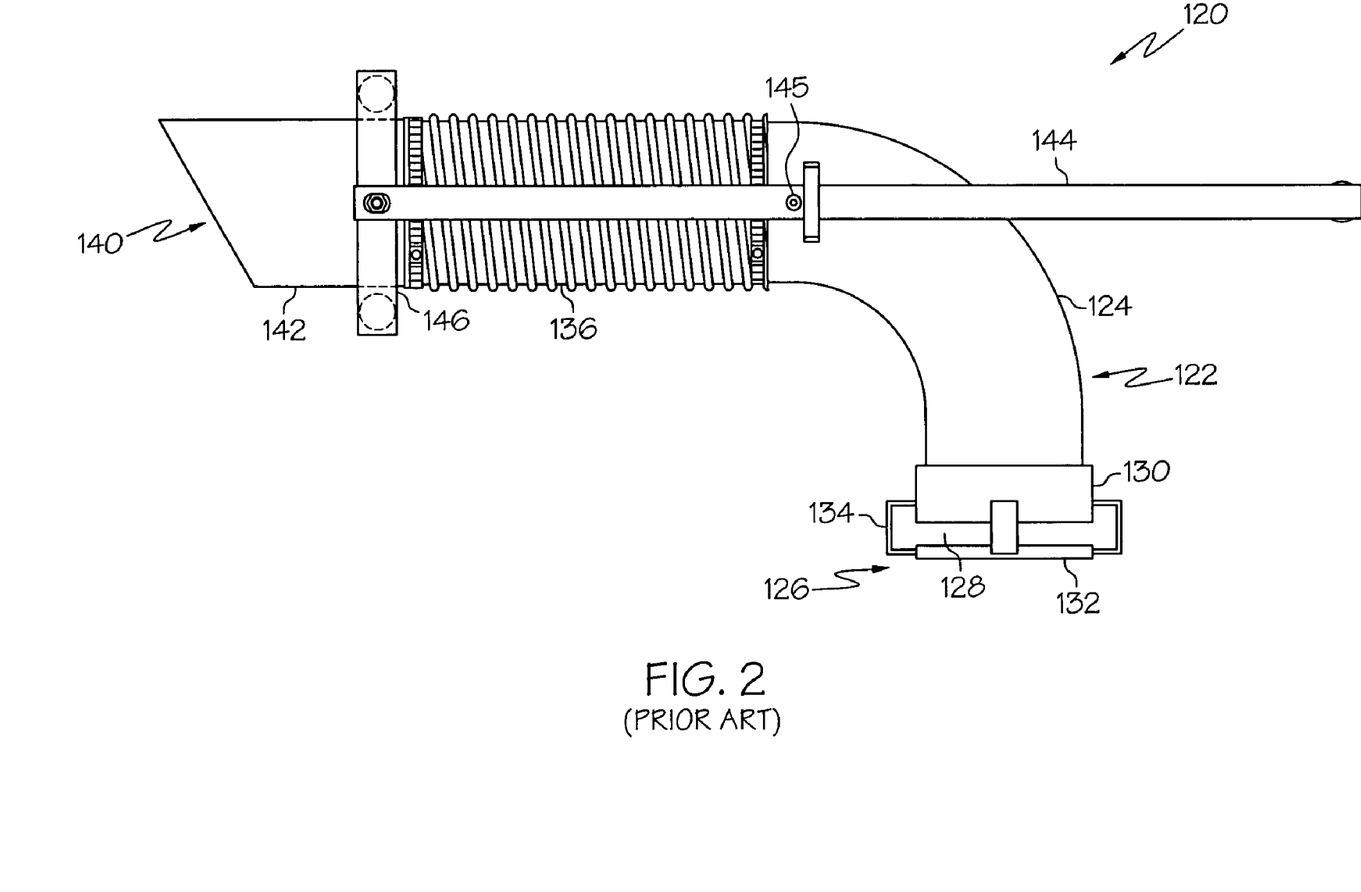
FIG. 2 is an enlarged view of the conventional adjustable discharge apparatus of FIG. 1.

The conventional adjustable discharge apparatus 120 includes a first conduit apparatus 122 with a mounting collar 126 including a bearing mount for rotatable mounting of the adjustable discharge apparatus 120 to the discharge tube 108 of the mulch spreader 100. As shown in FIG. 2, the mounting collar 126 includes a first circumferential member 130 with a second circumferential member 132 that is offset to define a circumferential bearing groove 128. Mounting structures 134 are provided to fix the position of the second circumferential member 132 with respect to the first circumferential member 130 without interfering with the bearing mount assembly 110 traveling in the bearing groove 128 as the first adjustable discharge apparatus 120 is rotated relative to the discharge tube 108.

The adjustable discharge apparatus 120 further includes a handle 144 pivotally attached at a pivot location 145 of the first conduit apparatus 122 and to a conduit 142 of a second conduit apparatus 140 with a handle bracket 146. The second conduit apparatus 140 is attached to the first conduit apparatus 122 with a flexible conduit 136.

In use, bales of mulch can be loaded at a bulk material inlet 106. The mulch spreader then breaks up the mulch into particulate matter. The bulk material is thereafter entrained in air and forced up through the discharge tube 108 to the adjustable discharge apparatus 120. The operator may adjust the angular position of the mulch discharge stream by rotating the first conduit apparatus 122 relative to the discharge tube 108. The elevational trajectory of the mulch discharge stream can also be altered by pivoting the handle 144 about the pivot location 145.

While the conventional mulch spreader illustrated in FIGS. 1 and 2 is useful for its intended purpose, there is a continuing demand for alternative adjustable discharge apparatus.

SUMMARY OF THE INVENTION

Accordingly, it is an object of the present invention to provide advantageous alternatives for conventional adjustable discharge apparatus. To achieve the foregoing and other objects in accordance with the present invention, exemplary embodiments of the invention are directed to adjustable discharge apparatus and adjustable discharge apparatus kits.

For example, exemplary embodiments of the present invention are directed to adjustable discharge apparatus comprising a first conduit apparatus including a first conduit section extending along an arcuate path about a pivot axis. The adjustable discharge apparatus further comprises a second conduit apparatus pivotally mounted about the pivot axis in a telescoping relationship with the first conduit apparatus. The second conduit apparatus includes a sealing structure adapted to provide a seal between telescoping portions of the first conduit apparatus and the second conduit apparatus. The sealing structure includes a substantially pliable sealing member with a lip having a first surface facing toward the first conduit section and a second surface facing away from the first conduit section. The sealing structure further comprises a support member engaging the second surface of the lip to facilitate engagement between the first surface of the lip and the first conduit section.

Additional exemplary embodiments of the present invention are directed to adjustable discharge apparatus comprising a first conduit apparatus including a first conduit section extending along an arctiate path about a pivot axis. The adjustable discharge apparatus further includes a second conduit apparatus pivotally mounted about the pivot axis in a telescoping relationship with the first conduit apparatus with a clearance area defined between telescoping portions of the first conduit apparatus and the second conduit apparatus. The second conduit apparatus includes a sealing structure adapted to seal the clearance area. The sealing structure includes a substantially pliable sealing member with a mounting portion and a lip. The mounting portion engages a mounting location of the second conduit apparatus and extends across the clearance area to the lip. The lip has a first surface facing toward the first conduit section and a second surface facing away from the first conduit section. The sealing structure further comprises a support member adapted to engage a surface of the sealing member extending across the clearance area.

Still further exemplary embodiments of the present invention are directed to adjustable discharge apparatus kits including a first conduit apparatus with a first conduit section extending along an arcuate path about a pivot axis. The kit further includes a second conduit apparatus for selective mounting to the first conduit apparatus. The second conduit apparatus is adapted to be removably and pivotally mounted about the pivot axis in a telescoping relationship with the first conduit apparatus. The kit also includes a third conduit apparatus for selective mounting to the first conduit apparatus. The third conduit apparatus includes a flexible conduit section. An end of the third conduit apparatus is adapted to be removably mounted to an end of the first conduit apparatus.

Exemplary adjustable discharge apparatus according to the invention will be more apparent in view of the following detailed description.

BRIEF DESCRIPTION OF THE DRAWINGS

The following detailed description will be more fully understood when viewed together with the drawings in which.

DETAILED DESCRIPTION OF EXEMPLARY EMBODIMENTS

Figure 3:
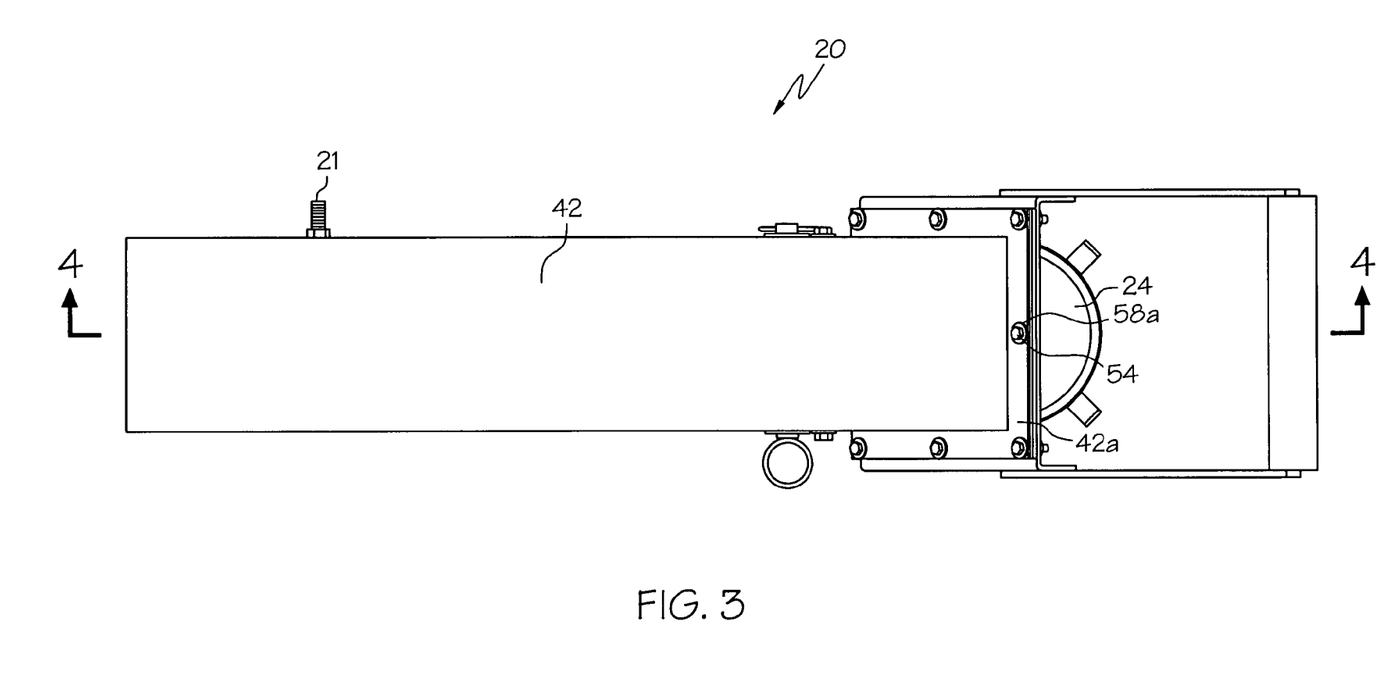
FIG. 3 is a top plan view of an adjustable discharge apparatus in accordance with exemplary embodiments of the present invention.

The adjustable discharge apparatus of the invention may be suitably adapted for mounting on a portion of a conventional bulk material discharge assembly. FIG. 3 illustrates a top plan view of an adjustable discharge apparatus 20 (e.g. mulch spreader) in accordance with exemplary embodiments of the present invention. In order to immobilize the adjustable discharge apparatus (e.g., during transport), a locking mechanism 21 may be provided. The locking mechanism 21, such as a bolt, may receive a bracket or brace attached to a nonmoving portion of the bulk material charge assembly.

Figures 4, 4A:
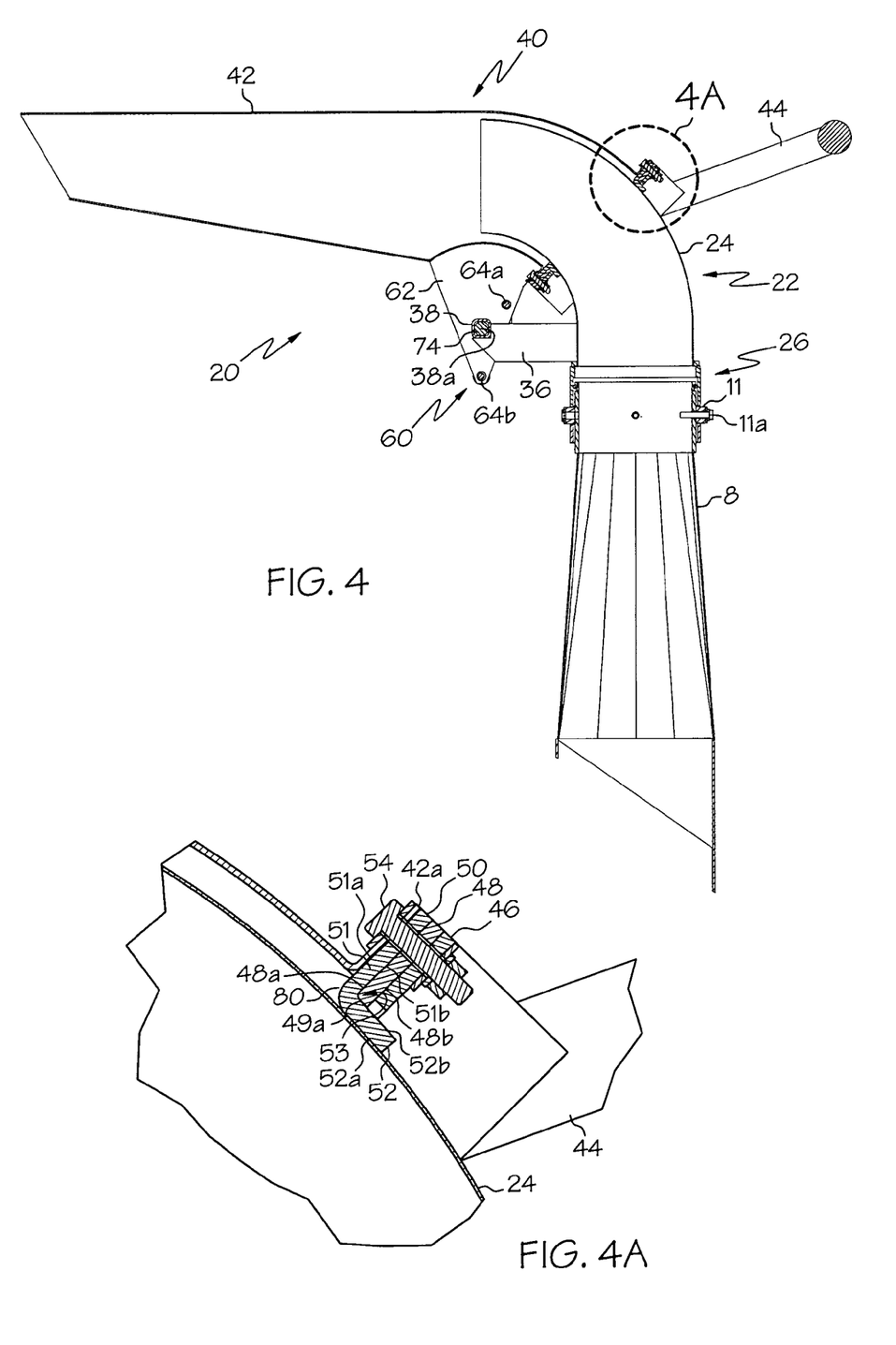
FIG. 4 is a sectional view of a first conduit apparatus and a second conduit apparatus of an exemplary adjustable discharge assembly, taken along line 4-4 of FIG. 3, wherein the second conduit apparatus is selectively mounted to the first conduit apparatus, and further wherein the first conduit apparatus of the adjustable discharge assembly is mounted to a discharge tube of a bulk material discharge assembly.
FIG. 4A is an enlarged view of an exemplary sealing structure taken at view 4A of FIG. 4.
Figure 5:
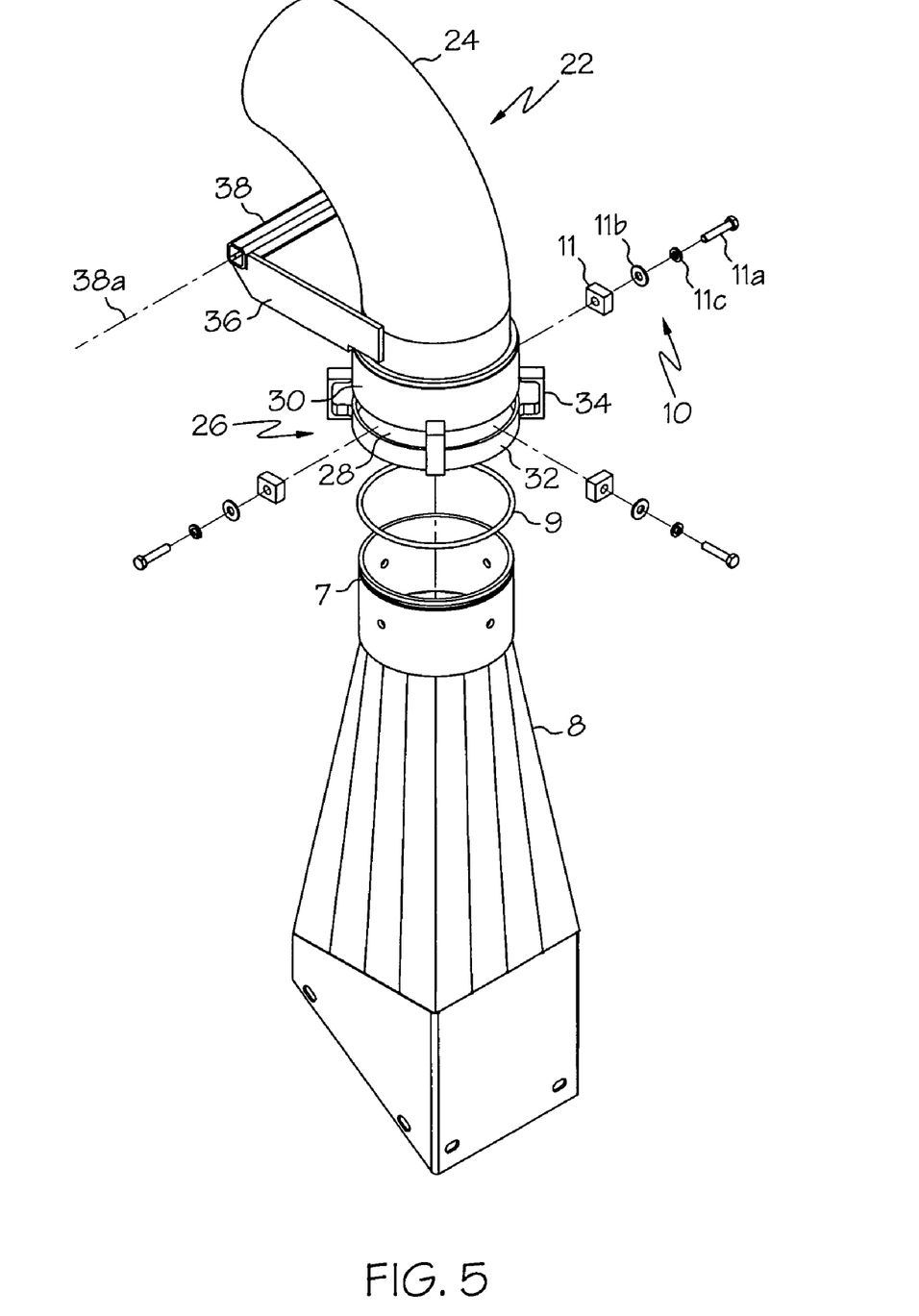
FIG. 5 is an exploded view of the first conduit apparatus and the discharge tube of FIG. 4.

FIG. 4 is a sectional view, taken along line 4-4 of FIG. 3, illustrating the adjustable discharge apparatus 20 mounted to a discharge tube 8 of a bulk material discharge assembly. As shown in FIGS. 4 and 5, the adjustable discharge apparatus 20 includes a first conduit apparatus 22 including a first conduit section 24 that extends along an arcuate path about a pivot axis 38a. In exemplary embodiments, the arcuate path can extend as a 90° elbow, although other arcuate paths with greater or less than 90° may be employed.

In exemplary embodiments, the first conduit section 24 can have a substantially circular cross-sectional profile. The circular profile can comprise a circular interior profile that may reduce friction associated with material flow through the conduit, thereby minimizing wear and enhancing material discharge. Moreover, the circular profile can also include a circular outer profile to provide a desirable sealing surface for other conduit apparatus that may be attached thereto. The first conduit section 24 can alternatively be manufactured with non-circular profiles while still demonstrating the inventive concepts of the present invention. For example, an elliptical, polygonal or other profile may be used to discourage or prevent rotation of the first conduit apparatus 20 with respect to other conduit apparatus mounted with respect thereto.

FIG. 5 is an exploded view of the first conduit apparatus 22 of the adjustable discharge apparatus 20 and the discharge tube 8 of the bulk material discharge assembly. The first conduit apparatus 22 may optionally be provided with a mounting assembly. Although not shown, mounting assemblies may be provided for nonrotatable mounting of the first conduit apparatus 22 with respect to the discharge tube 8. In nonrotatable applications, the ends of the first conduit apparatus and discharge tube may have a non-circular cross section and/or may have a key portion to prevent relative rotation therebetween. Alternatively, or in addition, a set screw or other fastening arrangement (e.g., screw, adhesive, etc.) may be used to facilitate nonrotatable mounting, for example, when ends of the first conduit apparatus and discharge tube have circular cross sections.

As shown in FIGS. 4 and 5, exemplary embodiments of the present invention permit rotatable mounting between the first conduit apparatus 22 and the discharge tube 8. In exemplary embodiments, the rotatable mounting allows the adjustable discharge apparatus to rotate about a vertical axis to control a direction of the radial discharge of a bulk material discharge stream in use. Rotatable mounting about a vertical axis permits angular adjustment of the radial discharge about the vertical axis that is substantially independent of elevational adjustment of the bulk material discharge stream. It is also contemplated that the mounting arrangement may permit rotation about a non-vertical axis for simultaneous angular and elevational adjustment of the bulk material discharge stream as the first conduit apparatus 22 is rotated about the non-vertical axis.

A wide variety of rotatable mounting arrangements may be used if the first conduit apparatus 22 is rotatably mounted with respect to the discharge tube 8. For example, as illustrated in FIGS. 4 and 5, the first conduit apparatus 22 can include a mounting collar 26 having a circular cross-section and adapted to receive a similarly shaped end of the discharge tube 8. In order to provide a substantially fluid tight connection between the rotatable members, the end of the discharge tube 8 may be provided with a circumferential gasket groove 7 for mounting a gasket 9 therein. The exemplary mounting collar 26 includes a first circumferential member 30 and a second circumferential member 32. The second circumferential member 32 is axially offset from the first circumferential member 30 to define a circumferential bearing groove 28 therebetween. Mounting structures 34 may be provided to support and fix the position of the second circumferential member 32 relative to the first circumferential member 30. Although not shown, further exemplary embodiments may provide the discharge tube with the collar for receiving a circular end of the first conduit apparatus.

In order to facilitate rotatable mounting of the first conduit apparatus 22 to the discharge tube 8, a bearing mount assembly 10 can be provided to permit rotatable adjustment while substantially arresting the axial position of the first conduit apparatus 22 with respect to the discharge tube 8. While various bearing mount assemblies may be provided, the exemplary bearing mount assembly 10 depicted in the figures includes a bearing member 11 for disposing at least partially in the circumferential bearing groove 28 and being attached to the end of the discharge tube 8 with a fastener, such as a bolt 11a. The bearing member 11 may comprise a low friction material such as a polymer or the like. A flat washer 11b may be provided to prevent damage to the bearing member 11 and a lock washer 11c may assist in maintaining the bolt 11a in place.

In order to mount the first conduit apparatus 22 to the discharge tube 8, the gasket 9 is first positioned within the gasket groove 7. Next, the mounting collar 26 of the first conduit apparatus 22 is positioned over the end of the discharge tube 8 and displaced until the gasket 9 engages the first circumferential member 30. One or more of the bearing mount assemblies 10 are then mounted to the discharge tube 8. As shown, the mounting structures 34 are designed to prevent interference with the bearing members 11 as they travel within the circumferential bearing groove 28 during rotation of the first conduit apparatus 22 with respect to the discharge tube 8. Alternatively, at least a portion of one or more of the mounting structures 34 and/or one or more stop members may be positioned for interference with the bearing members and/or other structures at certain rotatable positions, thereby limiting the rotational movement of the first discharge apparatus 22 once it is mounted with respect to the discharge tube 8. Such limited rotational movement may prevent the discharge stream from being inadvertently directed toward the motor of the bulk material discharge assembly or other undesirable locations. As shown, however, the adjustable discharge apparatus is capable of unlimited 360° rotations about the vertical axis.

Figure 6:
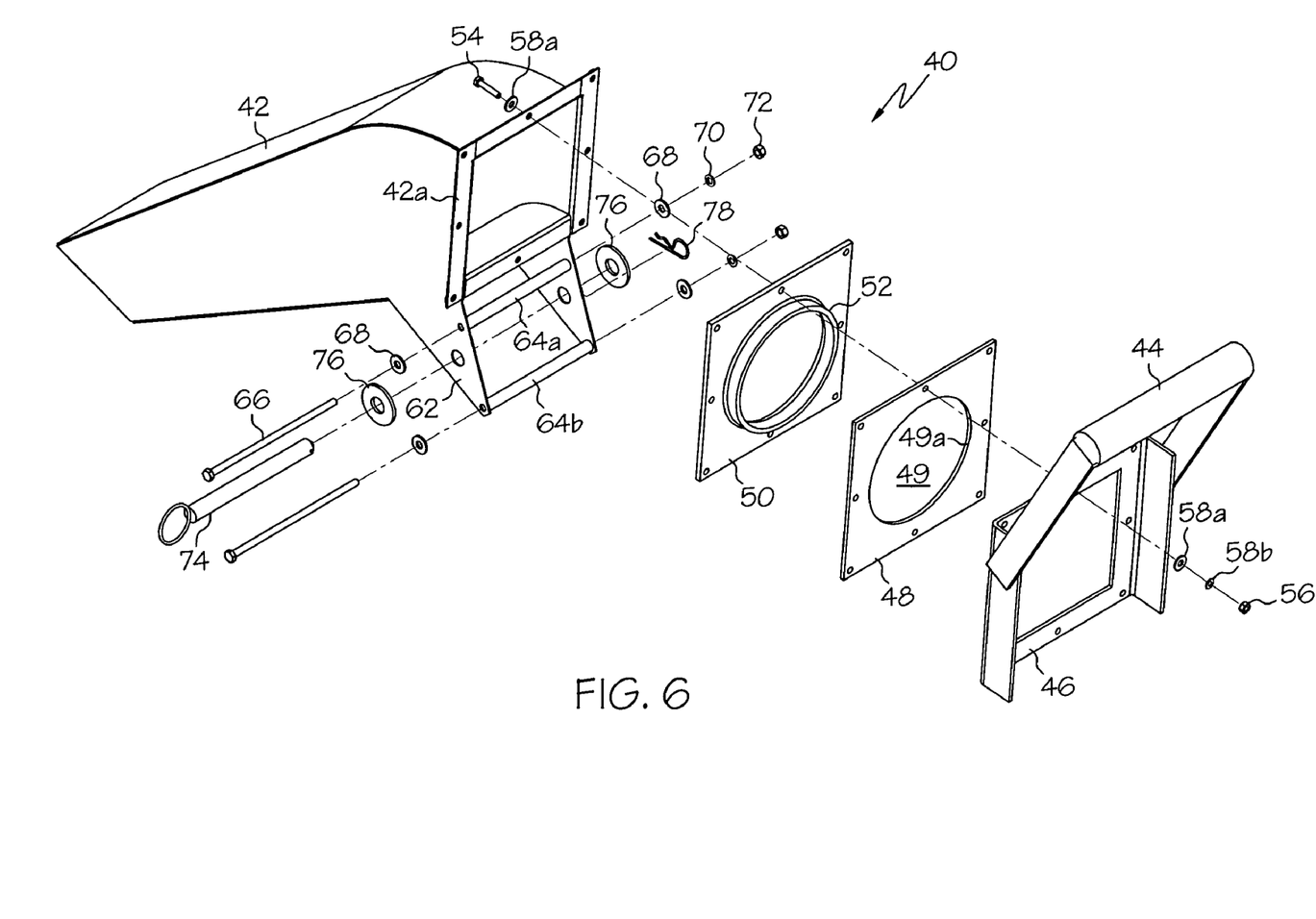
FIG. 6 is an exploded view of the second conduit apparatus of FIGS. 3 and 4 for selective mounting to the first conduit apparatus.

FIG. 6 depicts an exploded view of a second conduit apparatus 40 for selective mounting to the first conduit apparatus 22 in order to assemble an adjustable discharge apparatus in accordance with one embodiment of the present invention. The second conduit apparatus 40 includes a conduit 42 for directing a bulk material stream in a desired direction. Portions of the second conduit apparatus 40 have a cross-section in the shape of a four-sided polygon. Other polygonal shapes (e.g., having 3 or more sides) or non-polygonal shapes can also be used. In one embodiment, the second conduit apparatus may include a circular or elliptical cross-section. As shown in FIGS. 3-6, the first conduit section 24 has a substantially circular cross-section while portions of the second conduit apparatus are in the shape of a four-sided polygon to enhance the appearance of the adjustable discharge apparatus.

The first conduit apparatus 22 and/or second conduit apparatus 40 can also have mounting structures to assist in pivotally mounting the second conduit apparatus 40 with respect to the first conduit apparatus 22. Although a wide variety of mounting structures may be used, the second conduit apparatus 40 can include a mounting section 60 with a pair of opposed lateral brackets 62, each including an aperture. The apertures are aligned with one another to provide a mounting arrangement for a pivot pin 74.

Optional flat washers 76 may be provided to reduce bearing stress and a locking device 78, such as a cotter pin, can be used to prevent inadvertent displacement of the pivot pin 74. As shown in FIGS. 4 and 5, the first conduit apparatus 22 can include a mounting structure to cooperate with the mounting section 60 associated with the second conduit apparatus 40. As shown, the mounting structure can include a pivot bracket tube 38 extending along the pivot axis 38a for receiving the pivot pin 74. The pivot bracket tube 38 can be attached to the first conduit apparatus 22 with a pair of opposed lateral brackets 36. Although not shown, the pivot bracket tube 38 can alternatively be mounted to the lateral brackets 62 of the mounting section 60 associated with the second conduit apparatus 40. In this alternative embodiment, apertures may be formed in the lateral brackets 36 for receiving the pivot pin 74.

As shown in FIGS. 4 and 6, one or more optional stop members may be provided to limit pivotal movement of the second conduit apparatus relative to the first conduit apparatus. For example, as shown, an upper stop 64a and lower stop 64b may be provided. The lower stop 64b is adapted to engage the lateral brackets 36 to limit the lowermost pivoted position while the upper stop 64a is adapted to engage the lateral brackets 36 to limit the uppermost pivoted position. As shown in FIG. 6, each of the upper stop 64a and lower stop 64b may be assembled by placing a stop tube between the lateral brackets 62. Each stop tube is then fastened into place with an assembly of a bolt 66 and nut 72. Flat washers 68 may optionally be provided to reduce bearing stress while one or more lock washers 70 may also be provided to facilitate attachment of the stop tubes. As shown, the upper stop 64a and lower stop 64b may be provided as part of the mounting section 60 of the second conduit apparatus 40. Although not shown, one or more of the upper and lower stops may alternatively be provided on the first conduit apparatus 22. For example, the entire mounting section 60 may be switched with the lateral brackets 36 and pivot tube 38 of the first conduit apparatus 22.

The second conduit apparatus 40 can also include a sealing structure. A sealing structure is useful to reduce or prevent bulk material from exiting the adjustable discharge apparatus 20 through a clearance area between telescoping portions of the first conduit apparatus 22 and the second conduit apparatus 40. The sealing structure can optionally be designed to provide sufficient friction to maintain the position of the second conduit apparatus with respect to the first conduit apparatus without the need for an incremental latching or engaging mechanism. The sealing structure can therefore provide a smooth feel with continuous adjustment when adjusting the second conduit apparatus 40 with respect to the first conduit apparatus 22. The coefficient of friction and/or the force applied to the sealing structure can selected to reduce the effort required for adjustment while also providing a sufficient frictional force to assist in little or hands-free holding of the second conduit apparatus 40 with respect to the first conduit apparatus 22 in use.

One exemplary sealing structure is illustrated in FIG. 4A. A substantially pliable sealing member 50 includes a lip 52 having a first surface 52a facing toward the first conduit section 24 and a second surface 52b facing away from the first conduit section 24. Many alternative pliable materials may be used to fabricate the substantially pliable sealing member 50. For example, the sealing member can comprise a low friction, pliable material. In exemplary embodiments, the pliable material can comprise a woven and/or nonwoven fibrous material (e.g., a felt material). The substantially pliable material may also comprise a composite material to provide desirable sealing and functional characteristics such as increased durability while maintaining its pliable characteristics. In exemplary embodiments, the composite material can comprise elements of pliable and nonpliable materials as long as the overall composition exhibits a substantially pliable characteristic. For example, a nonpliable material may be distributed as a thin pliable mesh with fibrous material woven therein to define an overall durable, yet substantially pliable, sealing member. In addition, mounting portions of the substantially pliable material may have nonpliable characteristics.

In further exemplary embodiments, the substantially pliable sealing member 50 can comprise a mounting portion 51 for engaging a mounting location of the second conduit apparatus 40 and extending across the clearance area to the lip 52. As shown in FIG. 4A, the clearance area comprises an end area 80 between telescoping portions of the first conduit apparatus 22 and the second conduit apparatus 40. As shown, the mounting portion 51 extends across the clearance area by extending over the end area 80, rather than through the clearance area. Although the mounting portion 51 is shown immediately adjacent the end area 80, the mounting portion can also extend across the clearance area by passing over and substantially adjacent the end area 80, rather than through or immediately adjacent the clearance area. In still further embodiments, the mounting portion 51 can extend across the clearance area by passing through the clearance area (e.g., between the telescoping portions at a position adjacent to or offset from the end area 80).

In exemplary embodiments, the lip 52 can extend at various angles with respect to the mounting portion 51. For example, as shown in FIG. 4A, the lip 52 can extend from the mounting portion 51 at a 90° angle. The right angle orientation of the mounting portion 51 with respect to the lip 52 can be particularly useful in embodiments where the mounting location comprises a mounting flange 42a extending away from the first conduit section 24. As shown, the mounting flange 42a can extend about the periphery of an end of the conduit 42 for engagement with the mounting portion 51 of the sealing member 50. The mounting portion 51 can include a first surface 51a generally facing a first direction for enagement with the mounting flange 42a and a second surface 51b generally facing in a second direction opposite the first direction.

The sealing structure can further include a support member 48 for cooperation with the sealing member 50. In exemplary embodiments, the support member 48 is adapted to engage the second surface 52b of the lip 52 to facilitate engagement between the first surface 52a of the lip 52 and the first conduit section 24. In additional and/or alternative exemplary embodiments, the support member 48 is adapted to engage a surface of the sealing member 50 extending across the clearance area. For example, as shown in FIG. 4A, a first surface 48a of the support member 48 supports an area of the second surface 51b of the mounting portion 51 extending across the end area 80 of the clearance area. In still further embodiments, the support member 48 may engage the second surface 52b of the lip 52 while also engaging a surface of the sealing member 48 extending across the clearance area. For example, the angle between the lip 52 and the mounting portion 51 can define a transition area 53 such that the support member 48 extends into the transition area 53 to engage the second surface 51b of the mounting portion 51 and the second surface 52b of the lip 52.

While the support member 48 may comprise a wide variety of materials, exemplary support members include a substantially resilient material such as a resilient polymer (e.g., an elastomer). The support member 48 illustrated in FIG. 4A can be in compression such that it presses against the second surface 52b of the lip 52 to facilitate engagement between the first surface 52a of the lip and the first conduit section 24. Such compression can accommodate for surface imperfections in the first conduit section 24 and/or for variations in clearance areas that might occur as the second conduit apparatus 40 pivots relative to the first conduit apparatus 22.

As best illustrated in FIGS. 4A and 6 the support member 48 can comprise a substantially planar support plate provided with an aperture 49 wherein an interior surface 49a of the aperture 49 is adapted to contact the second surface 52b of the lip 52. Although not shown, the support member 48 can be substantially non-planar. For example, the interior surface 49a of the aperture can be extended by providing an outwardly extending flange to form a support member with a substantially L-shaped cross section. As best shown in FIG. 6, the interior aperture 49 of the support member 48 can be substantially circular while the outer perimeter of the support member 48 can comprise a four-sided polygon. The outer perimeter of the support member 48 can therefore correspond with a shape of the mounting flange 42a of the conduit 42 while the interior aperture 49 can correspond with the cross sectional shape of the first conduit section 24. Therefore, the support member 48 can act as an adapter to accommodate differences in shapes between the first conduit apparatus 22 and the second conduit apparatus 40.

As shown, the second conduit apparatus 40 can also include a handle 44 with a handle bracket 46. The handle 44 can facilitate pivotal adjustment of the second conduit apparatus 40 with respect to the first conduit apparatus 22. For example, the handle 44 can provide desirable leverage to reduce the effort required for adjustment. The handle can also be provided with a sufficient mass such that it at least partially functions as counterbalance to the weight of the conduit 42. In still further embodiments, the handle can permit rotational adjustment of the adjustable discharge apparatus 20 with respect to the discharge tube 8 of the bulk material discharge assembly. Although not necessary, the handle bracket 46 can be mounted together with the support member 48 and the sealing member 50 to simplify manufacturing and minimize costs by reducing the required hardware for mounting the handle and sealing structure to the conduit 42. In exemplary embodiments, the sealing structure and the handle 44 can be attached to the mounting location 42a (e.g., mounting flange) in a single mounting operation. For instance, the sealing member 50 can be first positioned such that the first surface 51a of the mounting portion 51 engages the mounting flange 42a. Next, support member is positioned such that the first surface 48a of the support member 48 engages the second surface 51b of the mounting portion 51 with the lip 52 extending through the aperture 49a of the support member 48. The handle bracket 46 can then be positioned to engage the second surface 48b of the support member 48. The sealing structure and handle 44 may then be mounted to the flange 42a with one or more bolt 54 and nut 56 arrangements. Each arrangement can include one or more flat washers 58a and/or lock washers 58b may be provided to reduce bearing stress and maintain the fastening arrangement.

As shown in the drawings, the lip 52 extends away from the clearance area. In alternative embodiments, the lip can extend into the clearance area between telescoping portions of the first conduit apparatus 22 and the second conduit apparatus 40. For example, the first surface 48a of the support member 48 may be first positioned to engage the mounting location 42a (e.g., mounting flange). Next, the lip 52 of the sealing member 50 can be inserted through the aperture 49 of the support member 48 such that the second surface 51b of the mounting portion 51 engages the second surface 48b of the support member 48. In this embodiment, the lip would be hidden from view in use.

Figure 7:
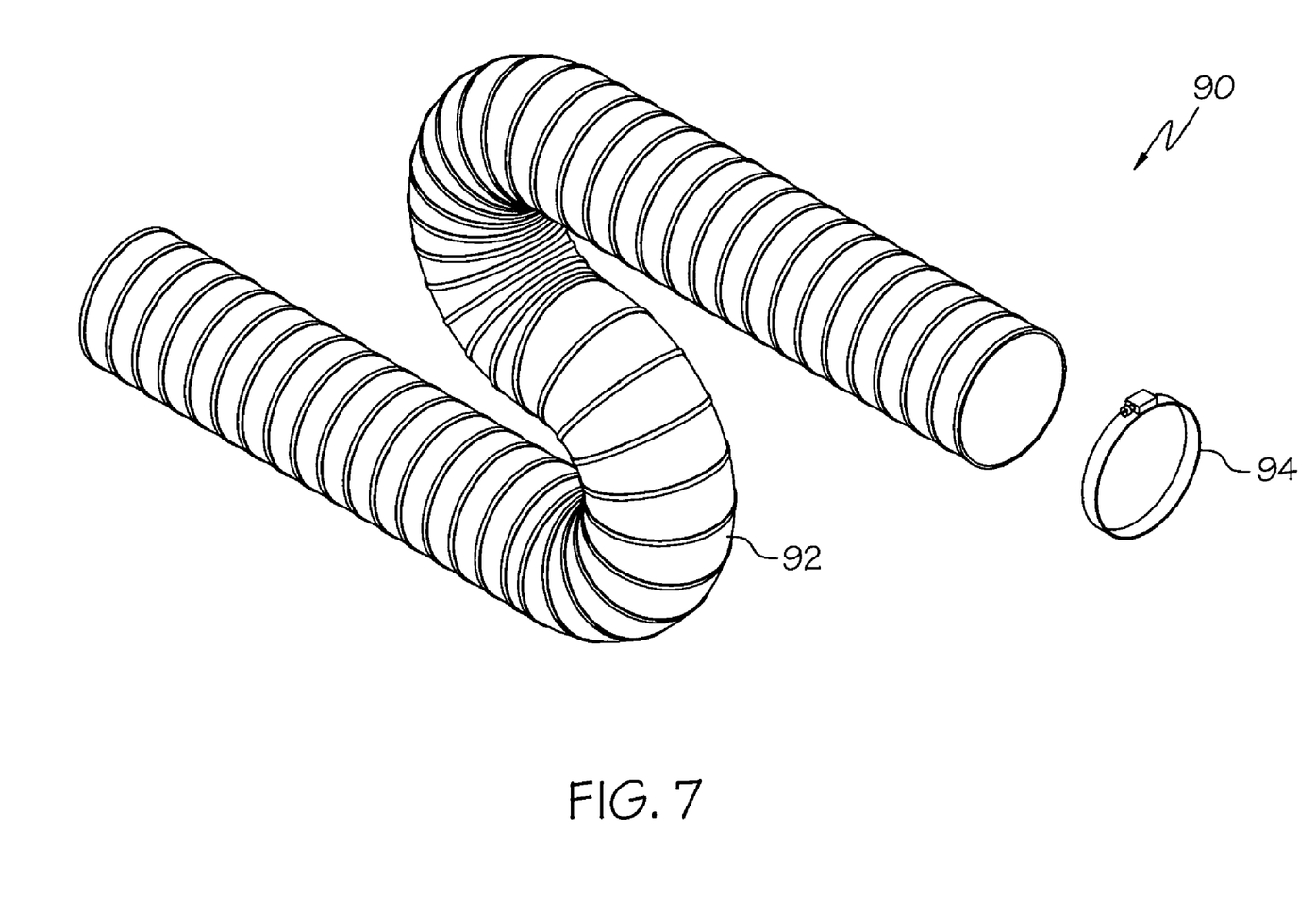
FIG. 7 is an exploded view of a third conduit apparatus for selective mounting to the first conduit apparatus.

The pivot pin 74 allows for selective mounting of the second conduit apparatus 40 to the first conduit apparatus 22. Depending on the particular application, the second conduit apparatus 40 may be removed and the first conduit apparatus 22 may be used alone for bulk material discharge or a third conduit apparatus may be mounted to the first conduit apparatus. One exemplary third conduit apparatus is illustrated in FIG. 7 and can comprise a flexible hose 92 an end of the flexible hose may be inserted over an end of the first conduit section 24 and removably mounted in place with a pipe clamp 94. The flexible hose 92 can be of particular use where the bulk material discharge assembly cannot be located close enough to a particular distribution area to make use of the second conduit apparatus 40. In exemplary embodiments, the consumer may be provided with an adjustable discharge apparatus kit that includes the first conduit apparatus 22, the second conduit apparatus 40 and the third conduit apparatus 90 for a wide variety of bulk material distribution applications.

Having shown and described exemplary embodiments of the present invention, further adaptations of the methods and apparatus described herein can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

What is claimed is:

1. An adjustable discharge apparatus kit comprising:
   a) a first conduit apparatus including a first conduit section extending from a first end to a second end along an arcuate path, wherein the first end of the first conduit apparatus is configured for mounting to a discharge tube of a bulk material discharge assembly,
   b) a second conduit apparatus including a second conduit section extending between respective ends, wherein one end of the second conduit apparatus comprises a conduit configured for directing a bulk material stream from the second conduit apparatus and in a desired direction, and wherein the second conduit apparatus is adapted to be removably and pivotally mounted about a pivot axis with respect to the first conduit apparatus such that the other end of the second conduit apparatus telescopingly relates with the second end of the first conduit apparatus for receiving bulk material from the first conduit apparatus, and
   c) a third conduit apparatus comprising a hose extending between respective ends, wherein one end of the hose is configured for directing a bulk material stream from the hose and in a desired direction, and the other end of the hose is adapted to be removably mounted to the second end of the first conduit apparatus for receiving bulk material from the first conduit apparatus,
   wherein the second end of the first conduit apparatus is configured to alternatively receive the second conduit apparatus and the third conduit apparatus.

2. The adjustable discharge apparatus kit of claim 1, wherein the arcuate path comprises a 90° elbow.

3. The adjustable discharge apparatus kit of claim 1, further comprising a pivot bracket tube extending along the pivot axis and a pivot pin adapted to extend at least partially within the pivot bracket tube.

4. The adjustable discharge apparatus kit of claim 1, further comprising a pivot bracket tube extending along the pivot axis and a pivot pin adapted to facilitate removable mounting of the second conduit apparatus with respect to the first conduit apparatus.

5. The adjustable discharge apparatus kit of claim 1 wherein the first end of the first conduit apparatus is configured for rotatable mounting to a discharge tube of a bulk material discharge assembly.

6. The adjustable discharge apparatus kit of claim 1 wherein the first end of the first conduit apparatus is configured for nonrotatable mounting to a discharge tube of a bulk material discharge assembly.

7. The adjustable discharge apparatus kit of claim 1, wherein the second conduit apparatus includes an upper stop and a lower stop adapted to limit pivotal movement of the second conduit apparatus relative to the first conduit apparatus when the second conduit section apparatus is in telescoping relationship with the first conduit section apparatus.

8. The adjustable discharge apparatus kit of claim 1, wherein the second conduit apparatus includes a sealing structure adapted to provide a seal between telescoping portions of the first conduit apparatus and the second conduit apparatus, the sealing structure including a support member and a substantially pliable sealing member including a lip with a first surface and a second surface, wherein the first surface of the lip is adapted to face toward the first conduit section and the second surface of the lip is adapted to face away from the first conduit section, and the support member is adapted to engage the second surface of the lip to facilitate engagement between the first surface of the lip and the first conduit section.

9. The adjustable discharge apparatus kit of claim 8, wherein the support member engages the second surface of the lip with an interior surface of an aperture.

10. The adjustable discharge apparatus kit of claim 8, wherein the support member includes a substantially resilient material.

11. The adjustable discharge apparatus kit of claim 8, wherein the sealing member includes a fibrous material.

12. The adjustable discharge apparatus kit of claim 8, wherein the sealing member further comprises a mounting portion and the lip extends at an angle with respect to the mounting portion.

13. The adjustable discharge apparatus kit of claim 12, further comprising a handle including a handle bracket, wherein at least a portion of the support member is positioned between the handle bracket and the mounting portion of the sealing member.

14. The adjustable discharge apparatus kit of claim 12, wherein the angle is approximately 90°.

15. The adjustable discharge apparatus kit of claim 12, wherein the angle defines a transition area, and wherein the support member extends into the transition area to engage a surface of the mounting portion and the second surface of the lip.

16. The adjustable discharge apparatus kit of claim 12, wherein the support member includes an interior aperture having an interior surface engaging the second surface of the lip.

17. The adjustable discharge apparatus kit of claim 16, wherein the support member comprises a substantially planar support plate including the interior aperture, the mounting portion of the sealing member includes a first surface generally facing in a first direction and a second surface generally facing in a second direction opposite the first direction, and a first surface of the support plate engages the second surface of the mounting portion.

18. The adjustable discharge apparatus kit of claim 17, wherein the interior aperture of the support plate is substantially circular and wherein the outer perimeter of the support plate comprises a four-sided polygon.

19. The adjustable discharge apparatus kit of claim 17, wherein the second conduit apparatus includes a mounting flange adapted to extend away from the first conduit section when the second conduit section apparatus is in telescoping relationship with the first conduit section apparatus, and wherein the first surface of the mounting portion engages the mounting flange.

20. The adjustable discharge apparatus kit of claim 19, further comprising a handle including a handle bracket engaging a second surface of the support plate, the second surface of the support plate generally facing away from the mounting portion of the sealing member.

* * * * *